United States Patent
Richardson

(10) Patent No.: US 12,365,628 B2
(45) Date of Patent: Jul. 22, 2025

(54) $CO_2$ IMPREGNATED CONCRETE

(71) Applicant: Robert George Richardson, Shingleton, CA (US)

(72) Inventor: Robert George Richardson, Shingleton, CA (US)

(73) Assignee: Scio-Tech, LLC, Las Vegas, NV (US)

( * ) Notice: Subject to any disclaimer, the term of this patent is extended or adjusted under 35 U.S.C. 154(b) by 0 days.

(21) Appl. No.: 17/728,887

(22) Filed: Apr. 25, 2022

(65) Prior Publication Data
US 2022/0356115 A1  Nov. 10, 2022

Related U.S. Application Data

(60) Provisional application No. 63/180,293, filed on Apr. 27, 2021.

(51) Int. Cl.
| | |
|---|---|
| C04B 24/28 | (2006.01) |
| C04B 14/28 | (2006.01) |
| C04B 40/00 | (2006.01) |
| C04B 40/02 | (2006.01) |

(52) U.S. Cl.
CPC ............ C04B 24/283 (2013.01); C04B 14/28 (2013.01); C04B 40/0039 (2013.01); C04B 40/0231 (2013.01)

(58) Field of Classification Search
CPC ... C04B 24/283; C04B 14/28; C04B 40/0039; C04B 40/0231
See application file for complete search history.

(56) References Cited

FOREIGN PATENT DOCUMENTS

| CN | 107140897 A | * | 9/2017 | ............ C04B 28/02 |
| JP | 2000302568 A | * | 10/2000 | ............ C04B 18/20 |

OTHER PUBLICATIONS

English machine translation of JP 2000-302568 (Year: 2000).*
English machine translation of CN 107140897 (Year: 2017).*
Akcaozoglu et al. An investigation on the use of shredded waste PET bottles as aggregate in lightweight concrete. Waste Management 30 (2010) 285-290. (Year: 2010).*

* cited by examiner

*Primary Examiner* — John E Uselding
(74) *Attorney, Agent, or Firm* — Trojan Law Offices

(57) ABSTRACT

Concrete made using the protocol described herein converts more of the available calcium hydroxide ($Ca(OH)_2$) into calcium carbonate ($CaCO_3$) and distributes it more thoroughly throughout the concrete mixture by converting it into calcium bicarbonate ($Ca(HCO_3)_2$) by adjusting the pH of the hydrating liquid and then deliberately adjusting the pH of the hydrating liquid again when precipitation of the $CaCO_3$ from the hydration liquid is desired to more uniformly coat the materials used in a concrete mix. This process creates more $CaCO_3$ in concrete than current methods on the market and that has been demonstrated to increase the structural and chemical properties of the concrete.

11 Claims, 17 Drawing Sheets

Figure 3

| COMPOUND | FORMULA | SHORTHAND NAME | PERCENT BY WEIGHT |
|---|---|---|---|
| Tricalcium aluminate | $Ca_3Al_2O_6$ | $C_3A$ | 10 |
| Tetracalcium aluminoferrite | $Ca_4Al_2Fe_2O_{10}$ | $C_4AF$ | 8 |
| Belite or Dicalcium silicate | $Ca_2SiO_5$ | $C_2S$ | 20 |
| Alite or Tricalcium silicate | $Ca_3SiO_4$ | $C_3S$ | 55 |
| Sodium oxide | $Na_2O$ | N | Up to 2 |
| Potassium oxide | $K_2O$ | K | |
| Gypsum | $CaSO_4 \cdot 2H_2O$ | $CSH_2$ | 5 |

Source: Mindess & Young

Figure 4

| Compound | Formula | Shorthand form |
|---|---|---|
| Calcium oxide (lime) | $CaO$ | C |
| Calcium hydroxide | $Ca(OH)_2$ | CA |
| Silicon dioxide (silica) | $SiO_2$ | S |
| Aluminum oxide (alumina) | $Al_2O_3$ | A |
| Iron oxide | $Fe_2O_3$ | F |
| Water | $H_2O$ | H |
| Sulfate | $SO_3$ | S̲ |

$CO_2$ IMPREGNATED CONCRETE

CROSS REFERENCE TO RELATED APPLICATIONS

This application claims priority to U.S. Provisional Patent Application Ser. No. 63/180,293, titled "$CO_2$ IMPREGNATED CONCRETE," filed Apr. 27, 2021, the entire disclosure of which is hereby incorporated by reference in its entirety for all purposes.

TECHNICAL FIELD OF THE INVENTION

The present disclosure generally relates to the field of concrete, and more particularly to new compositions and methods of preparing and using concrete.

BACKGROUND OF THE INVENTION

Portland cement based concrete is one of the most frequently used building materials in the world. Its commercial value is expected to exceed $600 billion/year by 2025. This common material is made when sand, aggregate, and other additives are mixed with dry portland cement and water. The mixture forms a fluid slurry that is easily poured and molded into shapes that have application in buildings, bridges, dams, and many other structures. Despite its ubiquitous presence, concrete's molecular structure remains a mystery making it difficult if not almost impossible to improve on its strength and integrity, Therefore, new methods and compositions are needed which transcends concrete's molecular ambiguity that provides heretofore unseen structural improvements to this material.

SUMMARY OF THE INVENTION

The disclosure provides compositions and methods of preparing and using these compositions for increasing the strength and integrity of concrete. These methods include producing high-surface-area polymers that when effectively integrated into a concrete crystalline structure, for example by using the procedure described herein, effect tensile and compressive strengths within the concrete monolith that exceed any available from the integration of conventional aggregates for example stone, polymers (without high-surface-area) and metals with irregular surfaces into a concrete monolith. The high-surface-area polymers can be produced by treating plastics, for example recycled polyethylene terephthalate (PET), plastic bottles by a process that, (a) partially dissolves the PET, (b) precipitates the dissolved PET monomers, (c) deposits the PET monomers made during partial PET disassembly, onto the non-dissolved PET in a solution containing a catalyst like antimony oxide ($Sb_2O_3$) and a non-reactive porogen solvent, for example toluene, (d) rinse with solvent, for example $H_2O$ after polymerization, (e) stabilize the polymer in buffered solution, for example calcium bicarbonate before drying and use.

The disclosed methods also include a process during concrete hydration, to predictably, (a) produce calcium carbonate ($CaCO_3$) from calcium hydroxide ($Ca(OH)_2$) in the concrete mix, (b) dissolve native $CaCO_3$ within the concrete mix while wetting concrete mix materials, (c) re-precipitate $CaCO_3$ more evenly on the surfaces of materials in concrete. All three cumulatively effecting stronger and less porous crystal structure within the concrete monolith. These actions are accomplished by pH adjusting water used in the concrete hydration process with appropriately added $CO_2$, carbonates, bicarbonates, oxides, and acids.

The disclose methods also include a process for increasing the percentage by weight of calcium carbonate ($CaCO_3$) and other minerals in portland based concrete by effecting desired chemical reactions to the materials used in concrete, for example, sand, aggregate, and high surface polymer, during the hydrating process by mixing the materials with a solution that is a precise blend of pH adjusted water, dissolved $CO_2$, and mineral additives, for example calcium bicarbonate, in confined space with atmosphere that is precisely enriched with $CO_2$. The hydration mixture of pH adjusted $H_2O$, salts and $CO_2$ is adjustable as required to produce concrete with varying physical characteristics or create a mixture that easily precipitates as $CaCO_3$ onto the surfaces of materials used in concrete, before the materials are combined in concrete, as described herein.

The disclosed methods are further directed to applying calcium carbonate ($CaCO_3$) and other mineral coatings to materials used in portland cement based concrete for example aggregate, sand, high-surface-area polymer, and metallic reinforcing materials prior to concrete component mixing. The coating of concrete materials with, for example $CaCO_3$ is accomplished by the following processes:

Indirectly applying calcium carbonate ($CaCO_3$) or other minerals applicable in concrete by spray coating the materials with aqueous calcium bicarbonate ($Ca(HCO_3)_2$) or other minerals, that are easily precipitated. The concrete materials are placed or conveyed on a surface that provides rotational motion to the materials, for example a vibrating table, that ensures all of the materials' surfaces are exposed to the spray. An example of "easily precipitated" is the conversion of soluble $Ca(HCO_3)_2$, into an essentially insoluble $CaCO_3$ coating on the concrete materials by warming the concrete materials wetted with $Ca(HCO_3)_2$. Heat promotes the chemical transformation of bicarbonate ions ($HCO_3^-$) to carbonate ions ($CO_3^{2-}$) and also evaporates water.

Indirectly applying calcium carbonate ($CaCO_3$) or other minerals applicable in concrete by bathing concrete materials in aqueous calcium bicarbonate ($Ca(HCO_3)_2$) or other materials, that are easily precipitated as $CaCO_3$. The concrete materials are sequentially placed in or conveyed through a bath or tank containing $Ca(HCO_3)_2$ for example, and then exposed to warm dry gas, for example air. An example of "easily precipitated" is the conversion of soluble $Ca(HCO_3)_2$, into an essentially insoluble $CaCO_3$ coating on the concrete materials by warming the wetted concrete materials. Heat promotes the chemical transformation of bicarbonate ions ($HCO_3^-$) to carbonate ions ($CO_3^{2-}$) and also evaporates water.

Indirectly applying calcium carbonate ($CaCO_3$) or other minerals to concrete materials, for example High-Surface-Area Polymer, by spraying it with a compound, for example calcium bicarbonate ($Ca(HCO_3)_2$), that is easily precipitated onto concrete materials as $CaCO_3$, when the concrete materials are suspended by and tumbled within a stream of pressurized gas, for example warm air. An example of easily precipitated is the conversion of soluble $Ca(HCO_3)_2$, into an essentially insoluble $CaCO_3$ coating on the wetted concrete materials when they are heated by the warm gas used to suspend and tumble them. The warm gas promotes the chemical transformation of bicarbonate ions ($HCO_3^-$) to carbonate ions ($CO_3^{2-}$) and also evaporates water.

BRIEF DESCRIPTION OF THE DRAWINGS

The disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 3 illustrates some of the chemical components of cement;

FIG. 4 illustrates some of the chemical shorthand used in concrete industry;

DETAILED DESCRIPTION OF EXEMPLARY EMBODIMENTS

Figure 1:
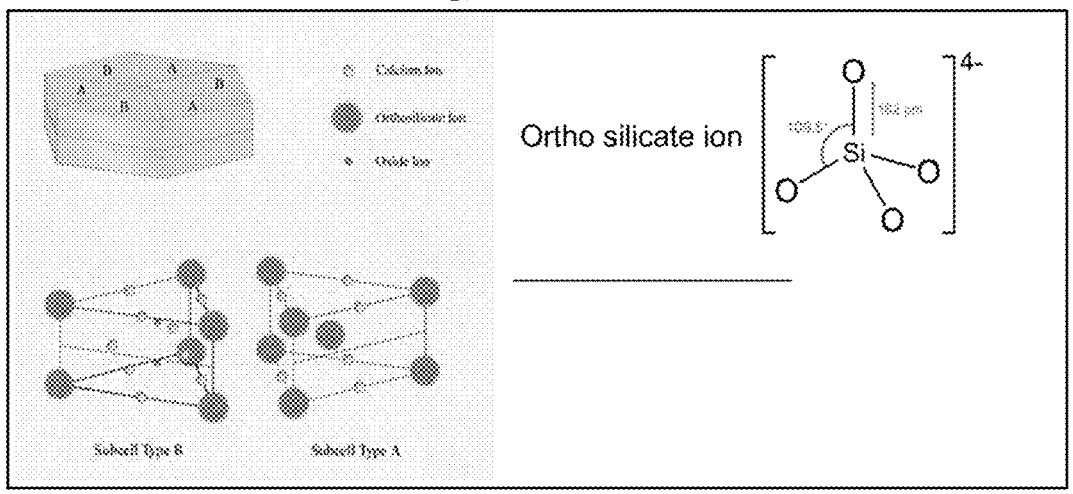
FIG. 1 illustrates alite ($Ca_3SiO_5$) a component of portland cement.

The following description is presented to enable a person of ordinary skill in the art to make and use embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, the disclosure is not intended to be limited to the examples described herein and shown but is to be accorded the scope consistent with the claims.

The word "exemplary" is used herein to mean "serving as an example illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

The specific order or hierarchy of steps in the process disclosed herein is an example of exemplary approaches. Based upon design preferences, it is understood that the specific order or hierarchy of steps in the processes can be rearranged while remaining within the scope of the disclosure. Any accompanying method claims present elements of the various steps in a sample order and are not meant to be limited to the specific order or hierarchy presented.

Although the terms cement and concrete are often used interchangeably, cement is actually an ingredient of concrete. Concrete is basically a mixture of aggregates and paste. The aggregates are sand and gravel or crushed stone; the paste is water and portland cement. Concrete gets stronger as it gets older. Portland cement is not a brand name, but the generic term for the type of cement used in virtually all concrete, just as stainless is a type of steel and sterling a type of silver. Concrete normally comprises from 10 to 15 percent of the cement mix, by volume. Through a process called hydration, the cement and water harden and bind the aggregates into a rock-like mass. This hardening process continues for years meaning that concrete gets stronger as it gets older.

The manufacturing of portland cement—the material that provides most of the crystallization for concrete—is a complex process that involves mining and grinding raw materials that include limestone and clay to a fine powder and heating them to as high as 1,450° C. Unfortunately, this process is quite carbon positive; as of 2018, cement production contributed about 10% of all carbon emissions to the atmosphere.

This pollution comes from two sources: (a) the heating process, which is typically driven by combustion of hydrocarbons, creates environmental pollutants, including nitrogen oxides (NOx) and carbon dioxide ($CO_2$); and (b) additional $CO_2$ is released to the atmosphere during the chemical reaction at that elevated temperature. This reformation (sintering) of the limestone (calcium carbonate), when it is converted into calcium oxide (CaO) is what is known as a calcination reaction, described in Equation 1.

$$CaCO_3 \rightarrow CaO+CO_2 \quad [1]$$

The cement preparation process can be made much greener using other patent pending technology by Robert Richardson (Provisional Patent Application No. 62/797,468 titled "CHEMISTRY SEQUESTERING OF CO2 USING CLOSED LITHIUM TECHNOLOGY," filed 28 Jan. 2019; U.S. patent application Ser. No. 16/773,293 titled "CHEMICAL SEQUESTERING OF CO2, NOx AND SO2", filed 20 Jan. 2020; and International application PCT/US2020/015207 of the same name and filing date.) that has the propensity to capture point sources of $CO_2$ made by combustion sources, for example cement kilns, and convert it in a carbon neutral or carbon negative way into sodium carbonate and sodium bicarbonate byproducts. The commercially viable byproducts of just referenced patent pending process by Richardson can be used as the source for $CO_2$ as described herein. The carbonate and bicarbonate byproducts also have the propensity to reverse ocean acidification when responsibly dosed into the sea.

The CaO described in Equation 1 is not stable. If not reacted with silicon dioxide ($SiO_2$) in the calcination process that results in cement, it will react with $CO_2$ in the air to recreate $CaCO_3$ in the reverse of Equation 1. Or, if exposed to $H_2O$, it will form $Ca(OH)_2$, described in Equation 2.

$$CaO+H_2O \rightarrow Ca(OH)_2 \quad [2]$$

During the calcination, CaO mineralizes with silicon dioxide ($SiO_2$) to form two of the primary components of cement: alite, also known as tricalcium silicate ($Ca_3SiO_5$) and abbreviated as $C_3S$ in the concrete industry; and belite, also known as dicalcium silicate ($Ca_2SiO_4$) and abbreviated as $C_2S$ in the concrete industry. As the material temperature rises in the calcination process, belite is first to form. Then, with further temperature increase, some of the belite combines with additional CaO in the mixture to form alite. The elevated temperature also causes the material to begin melting and form nodules called "clinker". Once clinker forms, the calcination process is complete, and the material is cooled. The rate of cooling affects the final ratio of alite and belite.

Once cool, the clinker is ground and mixed with mineral additives, including gypsum ($CaSO_4 \cdot 2H_2O$), that influence the chemical processes that occur at a later time when this final cement product is hydrated for use in making concrete.

Figure 2:
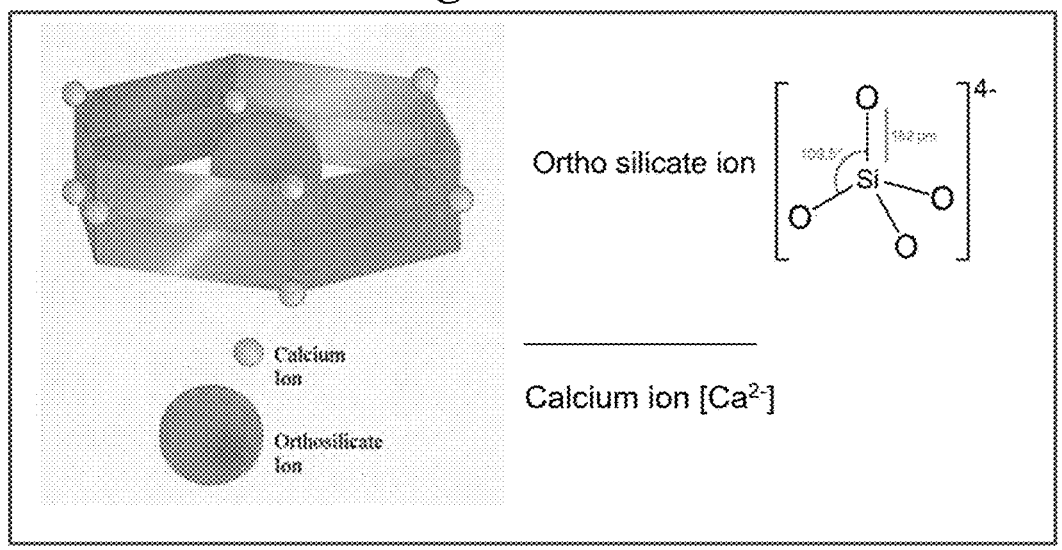
FIG. 2 illustrates belite ($Ca_2SiO_4$) another component of portland cement.

Alite is the major phase in portland cement responsible for setting and development of "early" strength. The other silicate, belite, contributes "late" strength, due to its lower reactivity. Alite is more reactive because of its higher calcium content and the presence of oxide ions in the lattice. FIG. 1 depicts the structure of alite. FIG. 2 depicts the structure of belite. Graphics for figures are from a Wikipedia article on alite and belite.

During the conventional cement hydration process the alite, belite and additives mix with water to form more than 30 crystalline products collectively known as Calcium Silicate Hydrates (C—S—H). The molecular formula abbreviations for the structure's components are connected with dashes to indicate there is no specific ratio relationship between the components of the mixture. The C—S—H structures have varying molecular ratios and include numerous impurities. Despite extensive investigation, this group's structural details are still poorly understood and yet concrete is one of the most used building materials in the world.

Although the ratios for C—S—H vary, the concrete industry has established generalized guidelines for the components. These are described in FIG. 3.

The "shorthand names" shown in FIG. 3 are based on the chemical abbreviations developed by the concrete industry. This shorthand is further explained in FIG. 4.

During a conventional concrete hydration process that begins when water is added to the mix of cement, sand, aggregate and possibly other additives, the crystallization that provides concrete strength is produced by the conversion of alite and belite in the cement into the C—S—H blend and calcium hydroxide ($Ca(OH)_2$), also known as CA. The abundance of $Ca(OH)_2$ in the hydrated cement paste varies with the ratio of $H_2O$ to cement and can reach approximately 26% of the total volume of a mature paste. Contrary to the C—S—H gel that is an ill-crystallized phase, $Ca(OH)_2$ is present predominantly in the form of well-defined crystalline structure (J. Marchand et al, Influence of Calcium Hydroxide Dissolution on the Transport Properties of Hydrated Cement Systems—Laval University, Canada 2021).

Description Process

Concrete made using the protocol described in this document converts more of the available $Ca(OH)_2$ into calcium carbonate ($CaCO_3$) and distributes it more thoroughly throughout the concrete mixture by a process that solarizes $CaCO_3$ as calcium bicarbonate ($Ca(HCO_3)_2$) and then precipitates it again onto materials in the concrete mix as $CaCO_3$ when the pH of the hydration water is changed by the unique concrete mixing environment provided in this process/protocol. This process/protocol is subsequently described in detail.

The addition of $CO_2$ to a confined environment around the concrete hydration process of this protocol is important because the $CO_2$ gas in the atmosphere dissolves into the water used to hydrate cement, often replenishing consumed $CO_2$ in the hydrate. A portion of the dissolved $CO_2$ spontaneously converts to carbonic acid ($H_2CO_3$) and the $H_2CO_3$ reacts with the $Ca(OH)_2$ and other materials in the concrete mix to produce calcium carbonate ($CaCO_3$) and other crystallin structures. Some of these reactions are shown in Equations 3, 4 & 5.

The concrete hydration process described herein, that occurs in an enclosed environment with elevated $CO_2$ gas and uses water with dissolved $CO_2$ and minerals, has demonstrated the ability to enhance the production of calcium carbonate ($CaCO_3$) and other compounds that form interconnected crystals in the concrete, resulting in a final product with increased structural and chemical resistance characteristics. This is explained in greater detail later.

The $Ca(OH)_2$ in cement is not a stable compound. It reacts with $CO_2$ to form $CaCO_3$ according to Equation 3. In conventional concrete production, this reaction can use $CO_2$ from the atmosphere but there may not be enough $CO_2$ available during mixing to react with all of the $Ca(OH)_2$ present in the cement. The process described herein fully converts the $Ca(OH)_2$ to $CaCO_3$ because the concrete mixing is done in an environment that provides the required amount of $CO_2$. The $CO_2$ is supplied to the concrete mix in the water used for hydration and provided in the atmosphere of the container used for cement mixing.

Furthermore, the process described herein regulates the concentration of $CO_2$ in the hydration water, and the hydration water pH, and the concentration of $CO_2$ in the gas in the atmosphere of the mixing environment. All of these variables are coordinated in a way that optimizes the placement of $CaCO_3$ and other materials on surfaces of aggregate and other components in the concrete mix in a way that optimizes the final product strength and chemical characteristics.

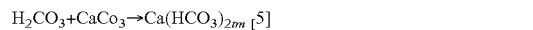

Figure 5:
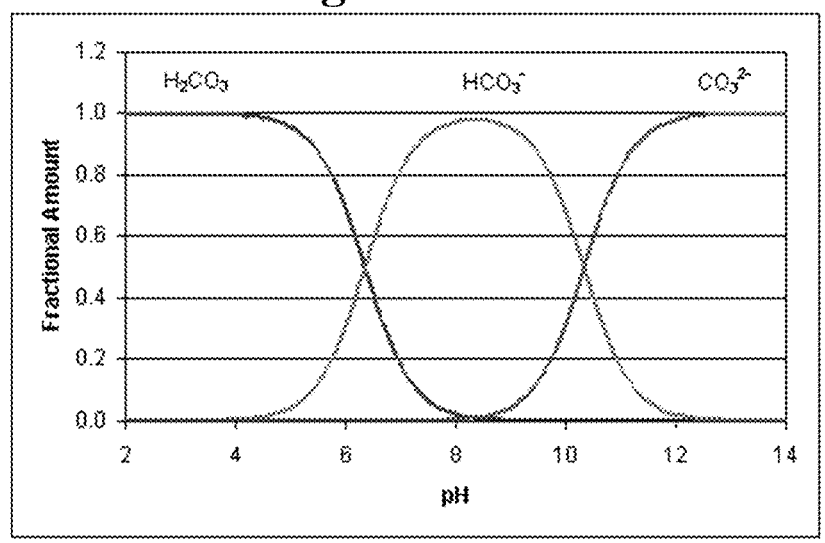
FIG. 5 illustrates carbonic acid, bicarbonate and carbonate equilibrium at different pH levels.

The pH of the hydration water is regulated through addition of carbonates, bicarbonates, oxides, and acids, for example carbonic acid, to affect the placement of $CaCO_3$ and other minerals. FIG. 5 graphically shows how a change in the pH determines which of the three reactions shown in Equations 3, 4, and 5 will occur in the concrete mix. Part of the technology described in this document pertains to the adroit regulation of these processes and others through the regulation of the mix pH, to enhance concrete strength and reduce permeability.

A brief introduction to the significance of the chemical equilibrium described in FIG. 5 is provided to contribute understanding of how pH adjustment in the concrete mix facilitates the creation of reaction environments that selectively favor Equations 3-5. The technology described in this document introduces two methodologies not found in conventional mixing procedures for portland cement-based concrete: the pH adjustment of water used for hydration in the concrete mix, and the addition of $CO_2$ gas into the concrete by mixing the concrete in an enclosed $CO_2$ enriched environment. The water pH is adjusted through a controlled chemical reaction with adjustment to the amount of $CO_2$ gas in the atmosphere of the enclosed mixing environment and through the dissolved carbonate and bicarbonate and hydroxide compounds previously added into the hydration water, for example, calcium bicarbonate and calcium hydroxide.

The addition of precisely dosed amounts of $CO_2$, bicarbonate, carbonate, hydroxide can create a liquid pH at a designated value anywhere between an acidic value of 3.6 and a basic value of 11.6. The solution pH determines which of the following forms will express themselves: $H_2CO_3 \leftrightarrow HCO_3^- \leftrightarrow CO_3^{2-}$. When the liquid in the concrete mix has a pH below 6, the $H_2CO_3$ is the predominant component of the carbonate mix. The $HCO_3^-$ ion is the predominant carbonate component at a liquid pH between 7 and 10, and $CO_3^{2-}$ is the predominant carbonate component when the liquid pH is above 11.

Therefore, Equation 3 is prevalent in a liquid with pH above 11, Equation 4 is prevalent at a liquid pH between 2 and 6, and Equation 5 is prevalent in a pH range between 7 and 10.

When the pH-specific water is added to the concrete mix it will react with its environment in accordance with its pH. The reactions between the water and the concrete mix will adjust the water pH and limit the extent to which a desired reaction will continue. However, this technology allows reactions described in Equations 4 and 5 to continue by re-introducing $CO_2$ into the water from the $CO_2$ gas in the mixing environment. The amount of $CO_2$ in the concrete mixing environment is precisely metered to effect the desired reaction within the mix. Details of how this is accomplished is provided later in this document.

Figure 6:
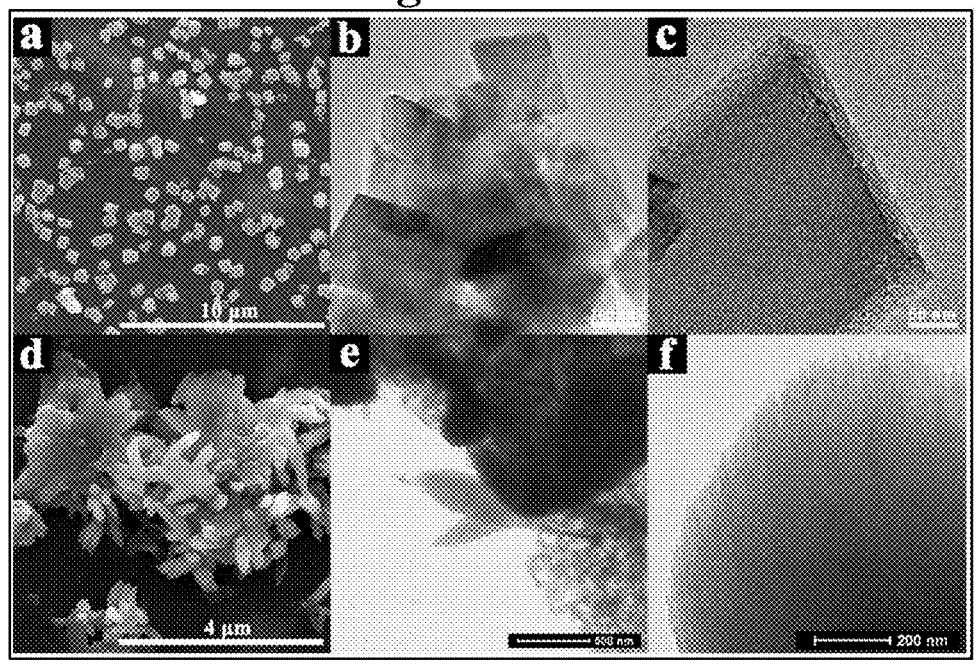
FIG. 6 illustrates various calcium carbonate crystalline structures.

Research by Jiang et al (Jiang, Calcite crystallization in the cement system: morphological diversity, growth mechanism and shape evolution—Phys. Chem. Chem. Phys., 2018), reexamined the phenomenon of carbonation in a cement system from the micron to nanometer scale. The research included calcium carbonate formation from lab-made C—S—H exposed to atmospheric $CO_2$ (approximately 420 ppm) at 25° C. and 50% relative humidity. Two crystal shapes were formed: cubic and spindle, as shown in FIG. 6. The study's conclusion identified a reaction between $CO_2$ and $Ca(OH)_2$—Equation 3, as the main source for crystalline $CaCO_3$ in portland cement. Similar results are found in literature (Cui, et al, Cem. Concr. Compose., 2017,77, 81-85).

The field of "concrete additives" is broad and complicated with many cross interactions between possible compound combinations. This document acknowledges that some concrete additives or additive combinations will germanely influence the chemistry and process described herein. Therefore, this document cautions against the addition of additives other than those specifically identified herein to a concrete mix when the results of the technology described in this document are desired.

Aspect 1—The Redistribution of $CaCO_3$

The first aspect of the process described in this paper focuses on rebalancing $CaCO_3$ within the concrete mixture to enhance product strength and reduce porosity. Through the use of pH adjustment in the process described below, $CaCO_3$ can be made from $Ca(OH)_2$ or re-dissolved from an area within the concrete mix—for example, deposits of $CaCO_3$ formed from $Ca(OH)_2$ that can comprise up to 26% of the mix mass in portland cement, and during, concrete hydration, by transporting and re-distributing the $CaCO_3$ in the hydration water after it is converted to soluble $Ca(HCO_3)_2$. The $Ca(HCO_3)_2$ is re-deposited as $CaCO_3$ again on another surface within the concrete mixture when the pH of the hydration water is subsequently changed. The re-depositing occurs when the water pH is increased through its exposure to the minerals in the concrete mix or adjustments in the water pH through the reduction of gas phase $CO_2$. This is an important feature of this process because it allows a more uniform distribution of $CaCO_3$ within the mixture and that is positively related to increased concrete physical properties, for example compressive strength.

In the first embodiment of this process, the concrete mixture contains conventional aggregate and no high-surface-area PET or other polymer. In this embodiment, the $CaCO_3$ is redistributed throughout the mix, and that provides three benefits: (a) more consistent bonds between aggregate and sand to C—S—H and other crystalline structures within the concrete mixture; and (b) it reduces the number of holes in the overall concrete crystalline structure, which reduces opportunities for internal attack from chemicals and general degradation through permeation; and (c) the concrete tensile and compressive strength of the concrete product are increased.

In the second embodiment of this process, the concrete mixture contains a both conventional aggregate and high-surface-area PET or another polymer. In this embodiment, the $CaCO_3$ is redistributed throughout the mix and provides five benefits: (a) more consistent bond aggregate and sand to C—S—H and other crystalline structures within the concrete mixture; and (b) the encapsulation of high-surface-area PET or other polymer into the overall crystalline structure of the concrete; and (c) reduction in the number of cavities within the concrete; and (d) reduces the weight of the concrete because the polymers have lower density than stone aggregate; and (e) the concrete tensile and compressive strength of the concrete product are further increased in direct proportion to the amount of high-surface-area polymer added.

In the third embodiment of this process, the concrete mixture utilizes high-surface-area PET or other polymer(s) to provide structure and volume to the concrete mix in place of conventional aggregate. In this embodiment, the $CaCO_3$ is redistributed throughout the mix to provide five benefits: (a) more consistently bonding to segments of C—S—H and other crystalline structures within the concrete mixture into a homogeneous material; (b) the encapsulation of high-surface-area PET or other polymer into the overall crystalline structure of the concrete; (c) reduction in the number of cavities in the concrete crystalline structure; (d) further reduction in the weight of the concrete per unit volume because the polymers are less dense than stone aggregate; and (e) the concrete tensile and compressive strength of the concrete product are further increased, beyond the increases from the second embodiment, in direct proportion to the amount of high-surface-area polymer added.

The basics of this process are summarized again for added clarity. This process creates, dissolves, and relocates $CaCO_3$ within the concrete mix during the hydration process. Controlled variations in the pH of water used for hydration determines which of the three activities will occur. Specific structural and chemical characteristics of the concrete batch are achieved through a combination of two variables, the specific pH adjustment sequences of water use for hydration and controlled variations in the concentration of $CO_2$ gas within the atmosphere of the enclosed space used for concrete hydration.

Optimized concrete physical properties are produced through repeated wetting and simultaneous dissolving or deposition of $CaCO_3$ on the aggregate, sand, and other additives included in a batch of concrete by water used for hydration that is impregnated with $CO_2$ and other additives. This process optimizes the $CaCO_3$ crystal formation that integrates the components of the concrete mix into a monolithic structure. The add mixture enhancements to the water and atmosphere within the hydration chamber can be done manually or via an automated process.

The $CO_2$ enhanced water converts $CaCO_3$ in the concrete mix into aqueous $Ca(HCO_3)_2$ solution according to Equations 4 & 5.

The aqueous $Ca(HCO_3)_2$ solution interacts with minerals in the concrete mixture. For example: (a) the aqueous solution can hydrate dry mineral material, and that interaction can dissolve the previously dry minerals and include them in the aqueous solution. This process can influence the pH of the aqueous solution. One result of a pH change is the conversion of $Ca(HCO_3)_2$ into $CaCO_3$ with resulting precipitation of the $CaCO_3$; and (b) the aqueous $Ca(HCO_3)_2$ can interact with minerals in a way that results in dissolving a portion of the mineral material. The increased total dissolved solids level in the aqueous $Ca(HCO_3)_2$ mix can push the $CO_2$ past its solubility limit and cause it to be expelled from the liquid into the closed reaction environment. This expulsion can facilitate a reaction between the gas phase $CO_2$ and $Ca(OH)_2$ in the concrete mix to produce $CaCO_3$ as described in Equation 3. The gas-phase $CO_2$ can also be re-dissolved into water in another area within the reaction chamber.

Aspect 2—The Creation of High-Surface-Area Polymers that are Effectively Integrated into Concrete Crystalline Structure A second aspect of this process is the strengthening of the concrete through the encapsulation of high-surface-area polymer or other material that contains nano to macro scale surface irregularities and protrusions into the concrete's crystalline $CaCO_3$ and C—S—H binders.

Added concrete strength is developed through a strong crystalline connectedness produced between components of the concrete mix including conventional aggregate and/or polymer materials with nano to macro scale surface irregularities and protrusions. This occurs to some extent during the conventional concrete hydration process but is enhanced when the pH regulated hydration water containing carbonate and bicarbonate minerals is used in the concrete mixing process. The high-surface-area polymer described herein attaches to the $CaCO_3$ and other crystallin structures within the concrete more effectively than conventional aggregate because of its increased high surface area exposed to the crystal attachment.

In some embodiments, the polymer material is made from previously used polymer materials (e.g., PET drinking water bottles). The previously used polymer or other polymer is re-engineered in a way to increase surface area and/or surface reactivity to enable coating and integration into the crystalline structure of the concrete.

This process is not related to the conventional use of low surface area polymers as primary plasticizers in concrete or the use of low surface area polymers merely as aggregate. In this process, the high surface area of added polymers allows it to be integrated directly into the crystalline structure of C—S—H and $CaCO_3$. Low surface area polymers have proven not to connect with the C—S—H and $CaCO_3$ as shown in FIGS. 7A & B.

Figure 7A:
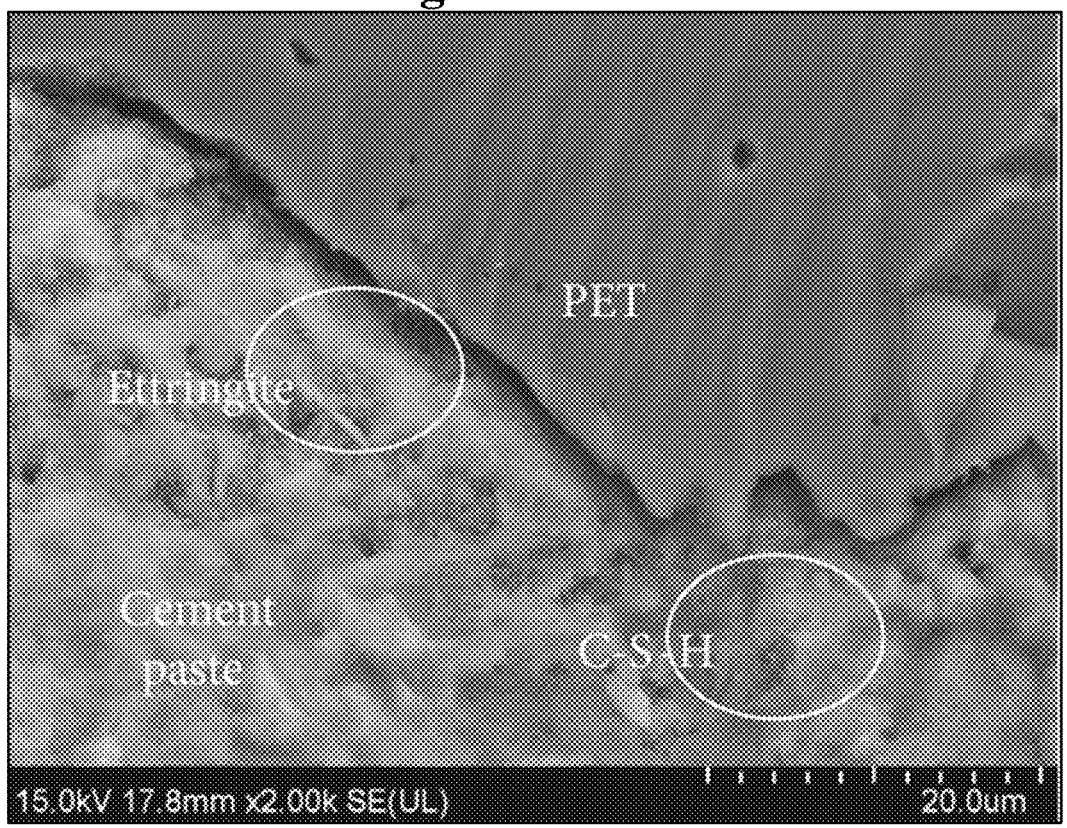
FIG. 7A illustrates no connection between the PET plastic and concrete crystalline structure.
Figure 7B:
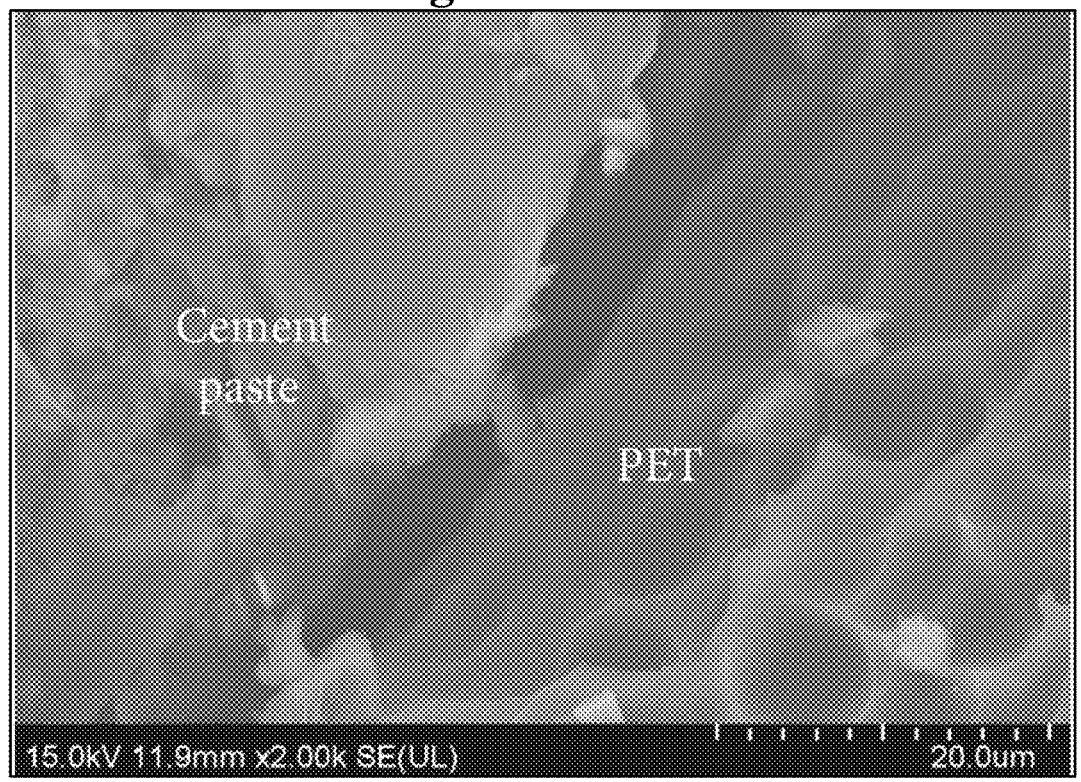
FIG. 7B illustrates no connection between the PET plastic and concrete crystalline structure.

FIGS. 7A & 7B prepared by Zoe Harmonie (Zoe Harmonie Lee, Modification of Waste Aggregate PET for Improving the Concrete Properties, Advances in Civil Engineering-Volume 2019, Article ID 6942052) clearly show no connection between the PET plastic and concrete crystalline structure. In preparation for his inclusion of PET plastic within the concrete mix the PET was treated with calcium chlorite ($Ca(ClO_2)_2$ and hydrogen peroxide ($H_2O_2$) but this treatment did not produce the high surface area produced by the process described in this document. The high-surface-area process presented in this paper does prepare the PET (or other polymer) surface with nano scale fibrous structures and holes. The technology used to produce this accomplishment is described in greater detail below.

The use of high-surface-area fibers described in this document means polymer or other material that contains nano scale fibrous features that enable them to be encapsulated into the $CaCO_3$ and C—S—H crystal structure. Without nano-micro scale surface irregularities and protrusions on the polymer, the $CaCO_3$ and C—S—H materials have no point of contact that is conducive to crystalline attachment and encapsulation.

Figure 8:
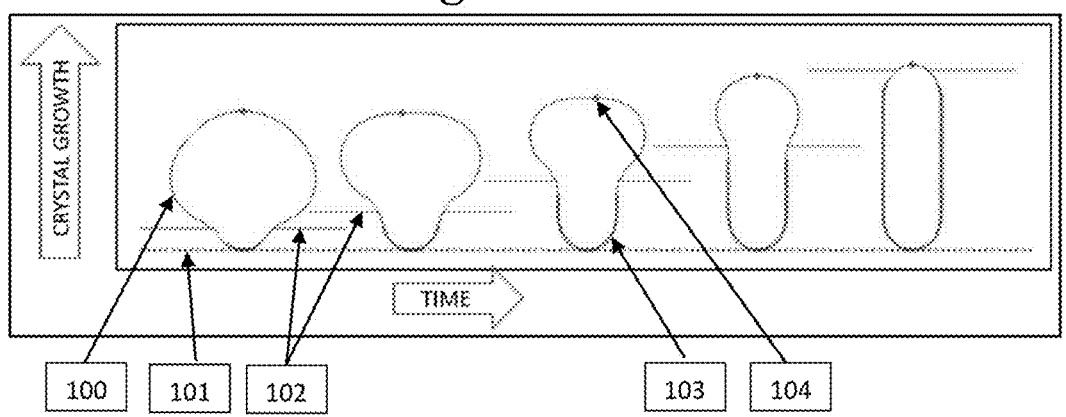
FIG. 8 illustrates the embedment of micelles in $CaCO_3$.

The work by Jiang, et al, provided insight for the development of the polymer encapsulation methodology. Jiang observed micelles are tightly encapsulated during a $CaCO_3$ crystallization process. Although micelles are not made of PET, they are representative because they both present a non-polar surface to the $CaCO_3$ and other minerals that precipitate in the crystallization process during the concrete hydration process. The crystalline attachment between the micelles and $CaCO_3$ and other minerals was tight enough to deform the soft micelles Jiang used in the experiments. This tight connection is required for the integration of a polymer into the overall concrete crystalline structure in a way that will effectively increase the overall monolith strength. FIG. 8 shows an artistic depiction of the micelle encapsulation process during Jiang's $CaCO_3$ crystallization.

Explanation of FIG. 8. Micromechanical simulation of the initially spherical micelle [101] incorporation. During burial, lateral micelle compression is accompanied by an initial downward contraction followed by upward extension. The bottom dashed line [101] indicates the surface on which the micelle is initially attached, while the horizontal solid lines [102] represent the top surface of the crystal as it grows around the micelle. The dark part of the micelle outline [103] shows boundary between crystal and micelle. The dot at the top of the micelle [104] outline represents the highest point of the micelle deformation caused by encapsulation within the crystal.

Figure 9:
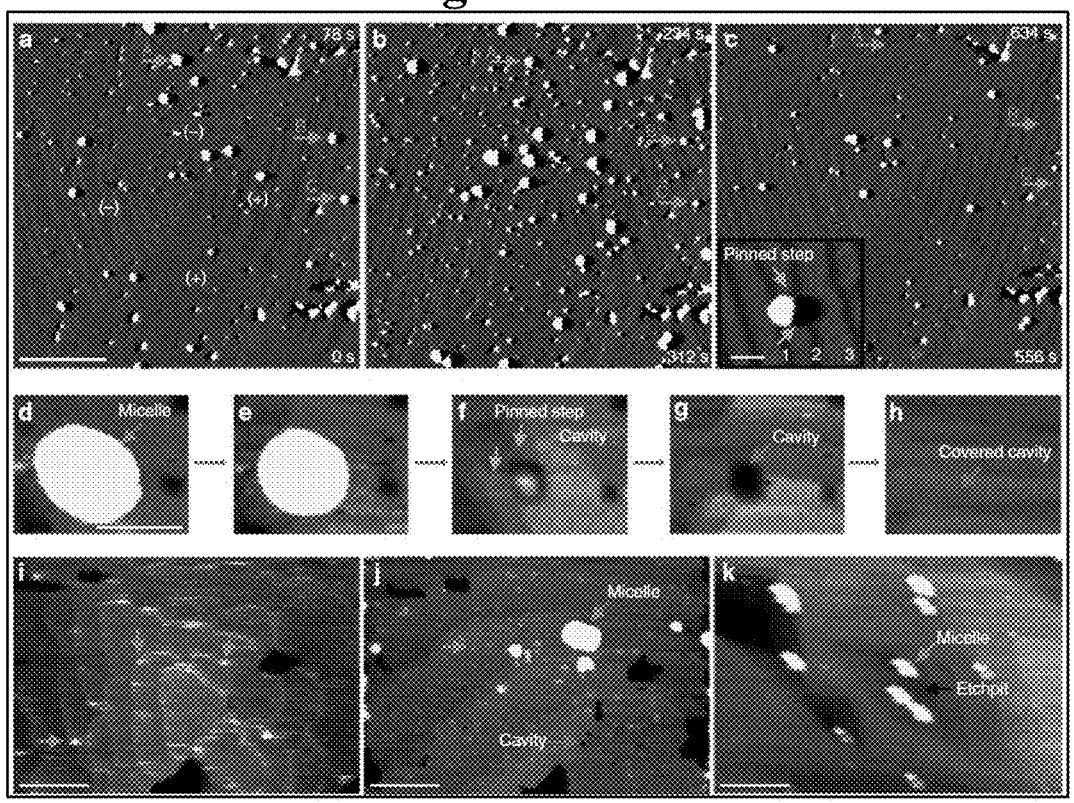
FIG. 9 illustrates electron microscopic images of micelle encapsulation.

The micelle capture process is shown in FIG. 9 uses electron microscopy to literally show the process described graphically in FIG. 8. Subsections (d) through (h) of the photographic assemblage best shows the process described graphically in FIG. 8. The red arrows in the FIG. 9 sequence d-h shows the process of micelle encapsulation within the $CaCO_3$ crystalline structure.

The following is the explanation of FIG. 9 that accompanied the graphic in its original format. Incorporation of carboxylated micelles and associated cavity generation. (a-c). Sequential in situ 3×3 μm AFM images of growing calcite surface at σ=1.49. Particles indicated by arrows in image (a) subsequently show a decrease in height in image (b), before undergoing complete burial in image (c). The times at which the bottom and top of the images (a-c) were collected are given in lower and upper right corners of images respectfully. Images (d-h) provide a detailed view of the burial of a large micelle (σ=2.66) into the crystallin structure. Image (i) shows calcite surface with adsorbed micelles (green arrows).

Figure 10:
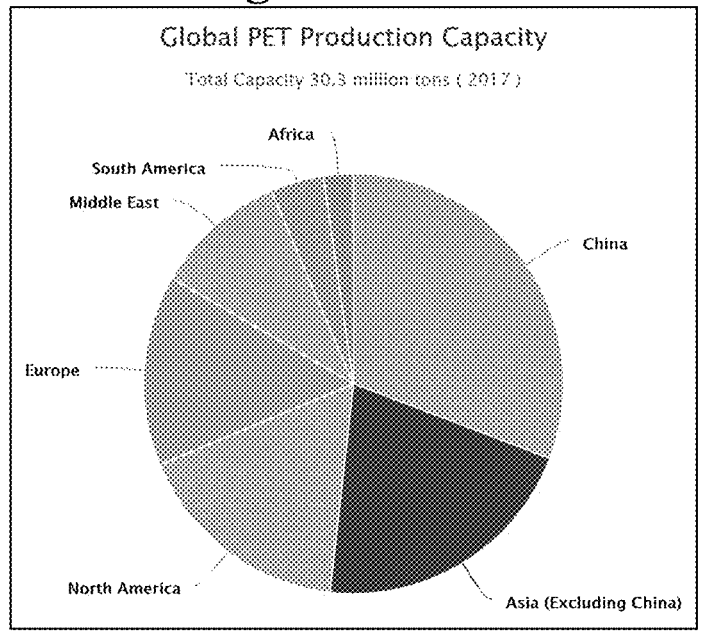
FIG. 10 illustrates global PET plastic production capacity.

Why is there a focus on reused PET as the polymer of choice for this process? First, it is abundant. The world production of PET in 2017 was 30.3 million tons. FIG. 10 shows the global production capacity for PET.

Figure 11:
FIG. 11 illustrates plastic waste usage in U.S. tons.

PET is manufactured in such large quantities because it is useful. The plastic is lightweight, water resistant, strong, non-toxic, and inexpensive (especially when recycled materials are used). Unfortunately, only about 29% is reused in some way, as shown on FIG. 11.

Fortunately, the process described in this document has the propensity to dramatically improve the percentage of reused PET.

PET's high production capacity is the result of its superior physical attributes. It is: readily available and relatively inexpensive; has high a strength-to-weight ratio; a tensile strength at yield of 85.5 MPa (concrete tensile is 2-5 MPa); a compressive strength at 2% deformation of 82.7 MPa (concrete compressive strength is 20-40 MPa); it is very resistant to moisture; has excellent chemical resistance to organic material and it is not biodegradable, which is good and bad, depending on your perspective on its intended use; it is virtually shatterproof; not toxic; and is easily recycled. These same attributes make PET a good choice for strength enhancement in concrete.

As noted above, smooth surfaced plastics are currently used in concrete as aggregate, but the process described in this paper takes exception to that process. In the process described in this document, only polymers or other materials with nano and micro irregularities and protrusions over all of its surface areas are integrated directly into the $CaCO_3$ and C—S—H crystalline structure through encasement of their nano and micro irregularities and protrusion by crystal growth.

On the contrary, the current practice of using low surface area PET as an "aggregate" in lightweight concrete has lowered the tensile and compressive strengths of concrete when compared concrete that does not include smooth/low surface area PET in lightweight concrete. This is the case because the low surface area PET is not attached to the crystalline structure of the concrete.

The previous statement is corroborated by Casanova-del-Angel et al (Casanova-del-Angel, et al, Manufacturing Light Concrete with PET Aggregate, International Scholarly Research Network 2012) research that provided comprehensive comparison tests between portland cement with conventional limestone aggregate and portland cement with low surface area PET aggregate. The following is a summary of his work:

Cement consumption is higher for light concretes with PET than for natural portland concretes.

The water/cement ratio is lower for light concretes than natural portland concretes.

The tensile strength of light concretes (with low surface area PET) is between 77% -82% of natural portland concrete.

The compressive strength comparison at 28 days was 222.06 $kg/cm^2$ for natural cement and 215.45 $kg/cm^2$ for light (PET) concrete.

There is a higher consistency for light concrete mixtures that contain low surface area PET than for natural concrete mixtures.

Although not included in the summary by Casanova-del-Angel, it is clear to a person having ordinary skill in this art that the low surface area PET aggregate did not have the same irregular surface finish as the limestone aggregate used in the conventional portland concrete. There was no mention in the article of any conditioning of the low surface area PET surface, and, therefore, one must conclude that the PET aggregate had the smooth/low surface area conventionally found on the plastic. The limestone aggregate naturally has irregularities that provide higher surface area and points of attachment. Furthermore, low surface area PET is known to be hydrophobic and will therefore resist interaction with liquids in the concrete mix that contain suspended carbonate.

Additional research on the use of low surface area PET in concrete was conducted by Nursyamsi, et al. (Nursyamsi, et al, The influence of PET plastic waste gradations as coarse aggregate towards compressive strength of light concrete, University of Sumatera Utara, Jalan Perpustakaan No. 5, Medan, 20155, Indonesia) His conclusion was that the surface area of PET with its shiny texture (glassy) made the attachment with concrete weak.

Research by Zoe Harmonie et al acknowledge the findings described above and referenced others that corroborate the understanding that untreated low surface area PET has a smooth and hydrophobic surface that prevents attachment or inclusion in calcium-based crystal structures inherent in portland concrete. His research did investigate the effects of treating low surface area PET waste using hydrogen peroxide ($H_2O$) and calcium hypochlorite solution ($Ca(ClO)_2$) before incorporating it in concrete as a coarse aggregate replacement.

Figure 12:
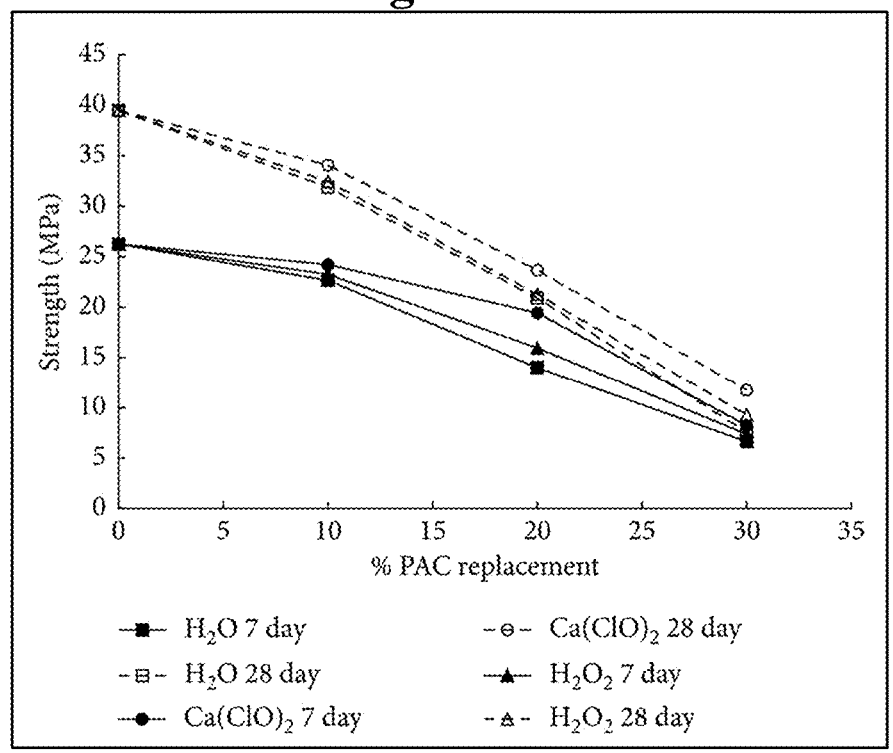
FIG. 12 illustrates an embodiment of the compressive strength of portland cement with PAC aggregate replacement with smooth surfaced PET plastic.

FIG. 12 reports Zoe Harmonie findings regarding decreased compressive strength with increased percent smooth/low surface area PET (identified as "PAC replacement" on the graph). It also shows that the low surface area PET treatment with $H_2O_2$ and $Ca(ClO)_2$ does make a modest improvement in the concrete compressive strength that is actually inconsequential in comparison to the overall decline in strength caused by the lack of attachment between the low surface area PET surface and the concrete crystalline structure.

The article by Zoe Harmonie includes photographs presented in FIGS. 7A and 7B that explain to someone with ordinary skill in the art that there is no connection between the low surface area PET and the concrete crystalline structure.

The modest improvement in concrete strength shown in comparison between the low surface area PET treated with $H_2O_2$ and $Ca(ClO)_2$ and the untreated low surface area PET presumably depicts the elimination of surface hydrophobic characteristic of the low surface area PET. This treatment process also provides the same benefit to the high-surface-area polymers presented in this specification for the same reason.

The combination of high-surface-area created by added nano-scale surface perturbations and oxidation of polymer functional groups to increase hydrophilic attraction is an optimal combination. This combination improves the enhanced high-surface-area PET's receptivity for encapsulation described previously by Jiang.

Methodology for producing high-surface-area on polymers was developed from work done by Mohamed, et al (Mohamed et al, Porous Copolymer Resins: Tuning Pore Structure and Surface Area with Non-reactive Porogens, Nanomaterials (Basel). 2012 June; 2(2): 163-186). The polymer chemistry process Mohamed describes involving nonreactive porogen solvents is incorporated as step 4 in the overall high-surface-area preparation process described below.

Mohamed's work describes the technique of creating nano-size polymer structures by adding a porogen solvent to the polymerization process liquid. His paper describes the "art" of selecting a porogen solvent that is compatible with the reaction and other technical details. For example, the appropriate porogen solvent does not chemically react with the polymerization process; instead, it creates temporary physical obstacles that interfere with laminar crystallization and force the crystallization to build around them. In the process, the crystallization pattern is filled with nano to micro size perturbations. The generic description of perturbation methodology provided guidance that resulted in the development of the purpose-specific nano technology process used in this technology for the modification of existing polymers.

The nano filament high-surface-area process described in this document has 6 steps. I am deliberately omitting process details for protection as trade secrets.

Begin by partially dissolving the clean and chipped scrap low surface area PET. The dissolving can be done many ways; one that provided consistently good results will be used as an example. Degradation using heated dimethyl sulfoxide (DMSO) ($C_2H_6OS$) as a solvent and hydrotalcite ($Mg_6Al_2CO_3(OH)_{16} \cdot 4H_2O$) as a catalyst. This method must be used with discretion because it has the ability to completely decompose low surface area PET in just a few minutes. Process temperature, stirring speed and use of catalyst are the primary controls on rate of reaction. The desired low surface area PET digestion percentage is between 5% and 25%, but there are situations when more or less are desirable. The determination of an optimized reaction condition including temperature, time and agitation was determined empirically and verified with electron microscopy.

Once the desired percent of low surface area PET disassembly is achieved, the reaction mixture is cooled. The addition of sodium hydroxide (NaOH) in methanol ($CH_3OH$) to a cooled solution will precipitate the two PET monomers: dimethyl terephthalate DMT ($C_6H_4(COOCH_3)_2$) and ethylene glycol EG ($HOCH_2CH_2OH$). The DMSO solvent and hydrotalcite catalyst can be used again after distillation, if desired.

The remaining (non-digested) low surface area PET is air dried at 190° C. to evaporate any remaining DMSO.

The dry and cool low surface area PET that was not digested is introduced to the DMT and EG monomers made during the PET's partial disassembly with a catalyst like antimony oxide ($Sb_2O_3$) and a non-reactive porogen solvent. These are combined in a process called suspension polymerization. The porogen solvent does not interact with the new polymerization chemically, but it does become physically involved in the re-polymerization process by "interfering with uniform crystallization in ways that create tunable pore structures and other shapes" that create high polymer surface area. Success in this process is directly related to the selection of the porogen solvent. An inappropriate choice of porogen solvents will create polymer that contains large clusters that reduce the polymer surface area. When done correctly, the reformed-polymer can have a surface area with $10^1$ to $10^3$ m²/g. Some of the candidates for porogens in this example involving polymers associated with PET are toluene or cyclohexanone. Both were effective in my research, but the toluene seems to produce the most consistent results.

Once the PET high-surface-area polymerization is complete, the product is rinsed in $H_2O$ to remove residuals from the polymerization step and bathed with agitation in a calcium bicarbonate ($Ca(HCO_3)_2$) solution at a pH between 7 and 10 for several hours or more. Agitation can be provided by turbulent liquid flow that causes the high-surface-area PET flakes to tumble in solution.

Figure 13:
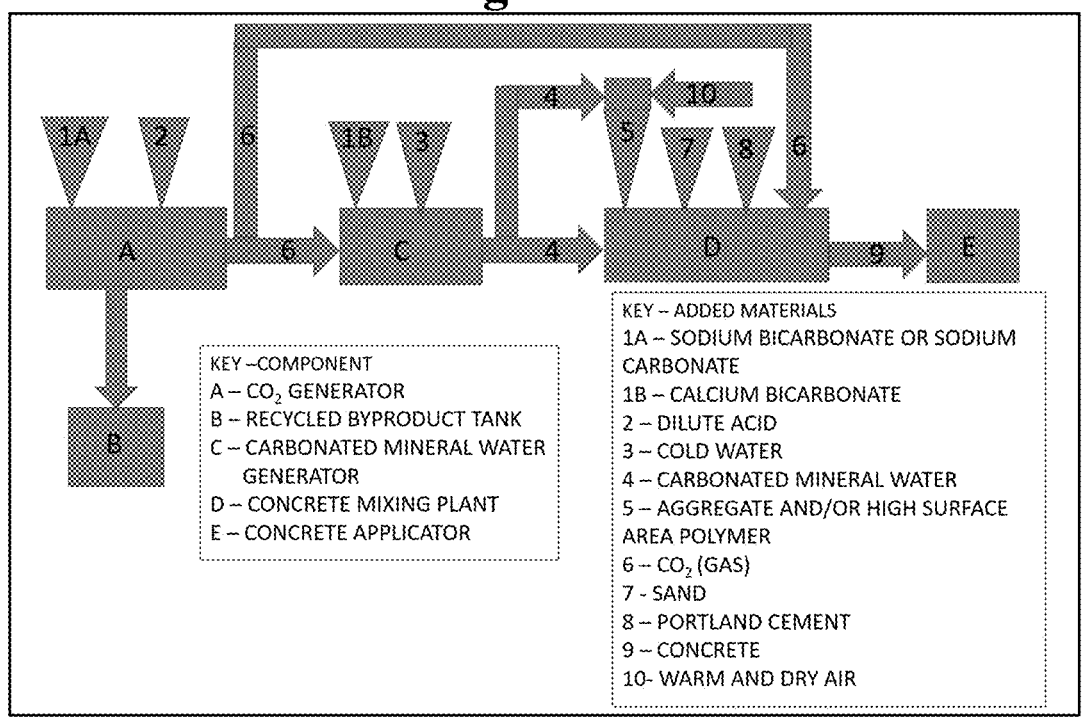
FIG. 13 illustrates an embodiment of the concrete mixing process flow.

The high-surface-area PET is dried at completion of the calcium carbonate bath and packaged for use in Hopper 5 of the concrete production process described in this document and shown in FIG. 13.

The following is an example of the many possible ways the high-surface-area PET product made from the process described above could be implemented in concrete hydration. These descriptions reference equipment shown in FIG. 13.

The concrete production technology displayed in FIG. 13 can be used as a batch or continuous process. This discussion is intended to provide an understanding that applies to both options.

The adjustment of concrete hydration water pH, concentration of dissolved $CO_2$ and the dosing rate of $CO_2$ gas into the mixing chamber's headspace (atmosphere) can occur manually or via an automated program that gathers sensor data from the concrete batch and integrates it into electronic directives that regulate the $CO_2$, carbonate, and bicarbonate dosing devices and the amount of all other materials added to the concrete mix. The automated methodology has the propensity to produce a concrete mix with more predictable results. In either case, this process requires dissolving $CO_2$ into water, and dosing carbonates and/or bicarbonates into the concrete hydration water then dosing of $CO_2$ into the closed concrete mixing reactor.

If the process control is manual, it is effected through manual positioning of hardware valves, hoppers etc. with minimal aid from instrumentation such as pH, temperature, total dissolved solids, and others.

If the mix is made using an automated program, the controller could be a PLC, FPGA, PC, Arduino, Raspberry Pi, or other type of programmable controller, hereinafter referred to as PLC. Data from process sensors such as pH, TDS, temperature, $CO_2$, weight of raw materials, and others is processed through a program that includes if-then logic, algorithms, and other programming to produce electronic commands that operate mechanical devices such as valves, hoppers, mixers, and other devices.

A PLC provides the operator with an opportunity to enter the batch-specific specifications pertaining to desired product strength, slump, gel time, quantity, chemical resistance, site temperature at point of use, and more. The mix process is controlled in real time using sensor data integrated into a quality control program sequence within the PLC. The PLC provides local displays on Human Machine Interface (HMI) screens or equivalent, provides local alarms, the ability to integrate with a Local Area Network (LAN), and relays data to the equipment supplier via LAN, modem, or other means that is required to monitor equipment performance. A remote communication ability between the process control equipment and the equipment supplier can also be used to monitor error conditions to determine if maintenance is needed, download updated programs, provide information for re-ordering of consumable supplies, and program lock-out if royalties are not paid.

Batch Plant Operating Sequence

The process begins by generating and storing $CO_2$ gas in Reaction Chamber A. The chamber is equipped with valves to regulate product flow in and out of the vessel, a pressure relief device, a pH probe, and an ability to mix the materials introduced into it. Hopper 1A stores a granular or liquid bicarbonate or carbonate material, for example sodium bicarbonate ($NaHCO_3$), calcium bicarbonate ($Ca(HCO_3)_2$ or sodium carbonate ($Na_2CO_3$). The hopper is pressurized to match the pressure of Chamber A and supplied with an automated valve and metered way to control the flow of product from the hopper into Reaction Chamber A. Metering can be accomplished many ways, for example, measuring the flow rate and flow time of material of known concentration leaving Hopper 1A, or measuring the difference in weight of Hopper 1A before, and after material has been transferred to Reaction Chamber A, or by transferring a quantity of material from Hopper 1A into an intermediate container that can determine the weight or volume of material introduced into it prior to further transferring the material into Reaction Chamber A. In another embodiment, the weight of Reaction Chamber A is measured to determine the quantity of ingredients added and/or removed. In this embodiment, one or more load cells are incorporated into the supporting structure of the hoppers and or reaction chamber to measure weight/mass.

An acid of known concentration, for example hydrochloric acid (HCl) is stored in Hopper 2. The hopper is pressurized, or the HCl can be pumped into Reaction Chamber A. In either event, Hopper 2 is supplied with an automated valve to control the flow of product from the hopper and a way to meter the amount of product that is introduced into Reaction Chamber A. Metering can be accomplished many ways, for example measuring the flow rate and flow time of material of known concentration leaving Hopper 2, or measuring the difference in weight of Hopper 2 after material has been transferred to Reaction Chamber A, or by transferring a quantity of material from Hopper 2 into an intermediate container that can determine the weight or volume of material introduced into it prior to further transferring the material into Reaction Chamber A.

The production of $CO_2$ gas in Reaction Chamber A is an automated or batch process. Alternatively, the $CO_2$ can also be supplied to Reaction Chamber C as cylindered gas or liquid product supplied from another source. At the completion of a reaction or at a designated interval, spent products are discharged via a port on the bottom of Reaction Chamber A when a valve is opened. Gas pressure and gravity provide the incentive for spent liquid to move through an open valve into Vessel B. The discharge port can be fitted with sensors that detect liquid flow and trigger valve closing when the spent liquid has voided Reaction Chamber A.

The Equations 6-11 are examples of possible reactions to produce $CO_2$ gas:

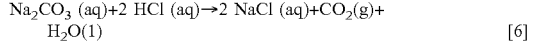
$$Na_2CO_3\text{(aq)} + 2\,HCl\text{(aq)} \rightarrow 2\,NaCl\text{(aq)} + CO_2\text{(g)} + H_2O\text{(l)} \quad [6]$$

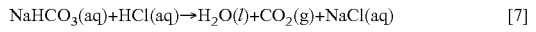
$$NaHCO_3\text{(aq)} + HCl\text{(aq)} \rightarrow H_2O\text{(l)} + CO_2\text{(g)} + NaCl\text{(aq)} \quad [7]$$

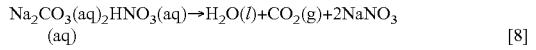
$$Na_2CO_3\text{(aq)} + 2HNO_3\text{(aq)} \rightarrow H_2O\text{(l)} + CO_2\text{(g)} + 2NaNO_3\text{(aq)} \quad [8]$$

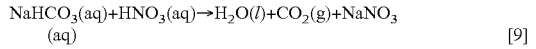
$$NaHCO_3\text{(aq)} + HNO_3\text{(aq)} \rightarrow H_2O\text{(l)} + CO_2\text{(g)} + NaNO_3\text{(aq)} \quad [9]$$

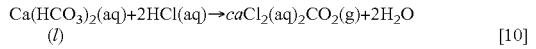
$$Ca(HCO_3)_2\text{(aq)} + 2HCl\text{(aq)} \rightarrow caCl_2\text{(aq)}_2CO_2\text{(g)} + 2H_2O\text{(l)} \quad [10]$$

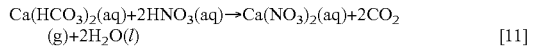
$$Ca(HCO_3)_2\text{(aq)} + 2HNO_3\text{(aq)} \rightarrow Ca(NO_3)_2\text{(aq)} + 2CO_2\text{(g)} + 2H_2O\text{(l)} \quad [11]$$

All of the reactions produce products that have commercial value. The NaCl produced in Equation 6 and 7 can be used as the consumable for a separately patented process by Robert Richardson that was reference earlier in this document that captures $CO_2$ and converts it into sodium bicarbonate ($NaHCO_3$) and sodium carbonate ($Na_2CO_3$). This invention can be used to generate the $Na_2CO_3$ and $NaHCO_3$ for the process described in this document. The $NaNO_3$ produced in Equations 8, 9 & 11 can be used as a fertilizer for plants and crops.

The equipment described in this section can make concrete in batch mode or continuously. The PLC has programs for both options. Each option is further refined during use by information from sensors affixed to process equipment. The following description provides generic orientation to the variables monitored and the influence each additive contributes to the overall concrete mixture.

Hopper 3 is filled with $H_2O$ at chilled or ambient temperature. Cooler water will dissolve more $CO_2$ than warm or hot water. The hopper can include water chilling apparatus and sensor(s) for pH, for temperature, and for Total Dissolved Solids (TDS). Other sensors for water mineral content can also be added. The information from sensors is relayed to the process controller for determination of the $H_2O$ quantity necessary for the calculated batch or continuous production mode.

Hopper 3 is supplied with an automated valve and pump to transfer the $H_2O$ into Reaction Chamber C. Metering can be accomplished many ways, for example measuring the flow rate and flow time of material leaving Hopper 3, or measuring the weight of Hopper 3 before and after material has been transferred to Reaction Chamber C, or by transferring a quantity of material from Hopper 3 into an intermediate container that can determine the weight or volume of material introduced into it prior to further transferring the material into Reaction Chamber C.

Reaction Chamber C can produce enhanced water for many different concrete mixes and applications. For example, a unique hydration liquid formula can be made for each type of concrete the plant can make, each with different physical characteristics, and/or the plant can create mixtures for pre-treating aggregate or high-surface-area polymers.

If a facility requires different carbonated water and mineral mixes at the same time, then at least two copies of Reaction Chamber C (FIG. 13) will be required. Each copy will ideally have one Hopper 3 and one or more Hopper 1B's.

When more than one Reaction Chamber C is required, it is recommended that both be equipped identically despite the separate planned usage. This feature provides redundancy and flexibility of the equipment's application. The units are equipped with valves to regulate product flow in and out of the vessel, a pressure relief device, a pH probe, TDS probe, temperature probe, $CO_2$ concentration, and an ability to mix the materials introduced into it.

One or more Hopper 1B devices store a granular or liquid bicarbonate material or other concrete add mixtures, for example sodium bicarbonate ($NaHCO_3$) or calcium bicarbonate ($Ca(HCO_3)_2$) or sodium carbonate ($Na_2CO_3$). The hopper is supplied with a valve and pump to control the flow of product from the hopper and a way to meter the amount of product that is introduced into Reaction Chamber C. In some embodiments, the valve is automated. Metering can be accomplished many ways, for example measuring the flow rate and flow time of material of known concentration leaving Hopper 1B, or measuring the weight of Hopper 1B before and after material has been transferred to Reaction Chamber C, or by transferring a quantity of material from Hopper 1B into an intermediate container that can determine the weight or volume of material introduced into it prior to further transferring the material into Reaction Chamber C.

Aspect 3—Summary of an Automated Concrete Hydration with Carbonated Water in a $CO_2$ Rich Mixing Atmosphere The addition of $CO_2$ into concrete is not new, however integrating $CO_2$ into a combination of compounds added to the hydration water that effect the desired chemical reactions during the concrete hydration process that result in an increased percentage by weight of calcium carbonate in the completed concrete mix by hydrating the concrete with a precise blend of pH adjusted water with dissolved $CO_2$ and mineral additives, for example calcium bicarbonate, while mixing the concrete in confined space with a precisely elevated $CO_2$ atmosphere is new.

As previously described in detail, this process precisely meters a pre-determined amount of water and carbonate or bicarbonate salts or other additives into Reaction Chamber C as shown on FIG. 13. This is followed by precisely metering a pre-determined amount of $CO_2$ from Reaction Chamber A or an alternative source, into Reaction Chamber C. A portion of the $CO_2$ spontaneously reacts with the water as described in Equation 4 to make carbonic acid ($H_2CO_3$), the precursor to many carbonate reactions. The remainder of the added $CO_2$ goes into solution within the $H_2O$ and into the headspace/atmosphere of Reaction Chamber C. This mixture of $CO_2$ impregnated $H_2O$ with dissolved salts, for example calcium bicarbonate, is then either introduced into Reaction Chamber D or to one or more copies of Hopper 5 or other devices. When the mixture made in Reaction Chamber C is made to hydrate concrete it is introduced into Reaction Chamber D at the appropriate time in the mix cycle. When the mixture made in Reaction Chamber C is used to pre-coat aggregate, high-surface-area polymer or other concrete additives, it is pumped to one or more devices designed to coat concrete materials with $CaCO_3$ or other minerals as described later in this document. At the completion of the $CaCO_3$ coating process, the end product is stored in one of the Hopper 5 devices The $CO_2$ impregnated water with mineral enhancement contribute to the concrete in three fundamental ways: (a) the $CO_2$ and $H_2CO_3$ in the hydration water provide a more efficient method of creating $CaCO_3$ and other crystalized minerals within the concrete mix, and these enhance the concrete strength and chemical resistance as previously described in detail, and (b) carbonate, bicarbonate, hydroxides, $CO_2$, and other compounds are used to adjust the pH of the hydration water and that determines which of the three processes, forming, dissolving, and precipitating $CaCO_3$ as described in Equations 3, 4 & 5, will occur. The deliberate control of process pH directly influences the effectiveness of $CaCO_3$ coating on aggregate, high surface polymer and other components of the concrete mix, (c) the carbonate, bicarbonate, hydroxides, $CO_2$, and other additives can influence the setting time, slump, and add additional concrete strength.

The $CO_2$ concentration in the water used for concrete hydration will be consumed during reactions with the concrete mix in Reaction Chamber D. However, it can be restored by adding additional $CO_2$ gas directly into the closed headspace/atmosphere of Reaction Chamber D. The $CO_2$ gas will re-dissolve into the water, as shown in Equation 4 (duplicated below). This can be useful when the concrete mix specification requires a protracted period of low pH in the water.

$$CO_2 H_2O \rightarrow H_2CO_3 \qquad [4]$$

The second use embodiment of Reaction Chamber C is the production of the carbonate/bicarbonate rich water used for $CaCO_3$ coating of aggregate and/or high surface polymer stored in Hopper 5. As noted earlier, both applications performed in Reaction Chamber C can use the same equipment. The primary distinction between the processes is the amount of $CO_2$ introduced into the mix and the propensity to use calcium compounds in this second embodiment. This second embodiment requires less $CO_2$ than the first embodiment.

Aspect 4—Additional $CaCO_3$ Coating for Aggregate or Polymer Materials

A fourth feature described in this document is the ability to provide additional thin coats of $CaCO_3$ and other carbonates on aggregate and/or high-surface-area polymer materials or other granular materials in the concrete mix. This pre-conditioning step enhances the amount of crystalline structure provided by $CaCO_3$ in the final concrete mix.

The compound $CaCO_3$ is the material of choice for surface coating, but its low solubility in water (0.013 g/L (25° C.)) complicates its application. This obstacle is overcome by transporting the calcium to the surface of materials for coating in the form of $Ca(HCO_3)_2$, with its higher solubility in water (166 g/L (25° C.), and then causing the $Ca(HCO_3)_2$ to transform into $CaCO_3$ through one of several methods. One method is through the change in pH of the solution containing $Ca(HCO_3)_2$ by the addition of an alkaline material, for example $Ca(OH)_2$. The increased pH causes the $Ca(HCO_3)_2$ to convert to $CaCO_3$ and then precipitate out of the solution onto nearby surfaces because of its low solubility in water. This pH driven chemical process conversion is described in FIG. 5 and is stoichiometrically described in Equation 12.

$$Ca(HCO_3)_2(aq)+Ca(OH)_2 \text{ (s) } 2CaCO_3(s)+2H_2O \qquad [12]$$

Another method to induce the precipitation of $CaCO_3$ from a solution containing $Ca(HCO_3)_2$ involves the removal of the volume of the liquid through evaporation. As the liquid volume is reduced, $CO_2$ dissolved in the liquid is driven off into the reaction chamber or hopper when its solubility limit in water is exceeded. The $CO_2$ liberated into the chamber or hopper can be captured using a $CO_2$ Capture & Repurpose process developed by Richardson. The reduction in $CO_2$ indirectly increases the pH of the solution and that pH increase promotes the precipitation of $CaCO_3$ as described in FIG. 5.

In all embodiments of $CaCO_3$ deposition onto high-surface-area polymer, the deposition process is enhanced when the polymer is pretreated with chlorine dioxide ($ClO_2$) and hydrogen peroxide ($H_2O_2$). This process developed by Zoe Harmonie is described above. The treatment has been shown to mitigate polymers' natural hydrophobic characteristic and enhances the attachment of the calcium compound that is introduced through spray or other means.

In the first embodiment (FIG. 14) of this $CaCO_3$ depositing process, water at ambient temperature, containing bicarbonate, for example $Ca(HCO_3)_2$, and $CO_2$, is sprayed on the aggregate, sand, or high-surface-area polymer while on a conveyor leading to Hopper 5, or on a surface with vibration that causes the aggregate, sand, high-surface-area polymer, or other material to reposition itself and thereby exposing other surfaces to the spray. Once the aggregate, high-surface-area polymer, or other material is stored in Hopper 5, it is sequentially treated with dry, warm air and water containing $Ca(HCO_3)_2$ and/or other carbonate compounds at ambient temperature. The warm air evaporates the water on the surfaces and as the water volume decreases, $CO_2$ is liberated from the bicarbonate ions ($HCO3^-$) to produce carbonate ions ($CO_3^{-2}$), with a resultant increase in pH of the remaining mixture volume. Stated another way, the increase in liquid pH promotes the conversion of $Ca(HCO_3)_2$ into $CaCO_3$ that precipitates on a nearby surface. This repeated pair of activities will promote the development of a carbonate film on the aggregate and/or high surface polymer. The $CaCO_3$ that adheres to the hopper walls can be recovered and reused by dissolving it into a dilute acid, for example hydrochloric acid, and then reclaiming it from the acid by reducing the pH.

This cycle is repeated as required to build a thin layer, for example 25 microns or 50 microns of $CaCO_3$ on the aggregate or high-surface-area polymer. It is important to terminate the process before the aggregate or high-surface-area polymer becomes fused into a solid mass that is not broken up simply by opening the gate valve on the bottom of Hopper 5.

In the second embodiment (FIG. 15) of this $CaCO_3$ depositing process, water at ambient temperature containing bicarbonate, for example $Ca(HCO_3)_2$ and/or other carbonates, is pumped into Hopper 5, or some other vessel to a depth that covers the aggregate or high-surface-area polymer. The water/carbonate mix is drained after wetting the aggregate/high-surface-area polymer. After the liquid is drained from Hopper 5, or other vessel, Hopper 5 or the other vessel is exposed to warm dry air or other gases. The aeration continues as long as required to dry the aggregate/high-surface-area polymer surfaces. The warm air evaporates water on the surfaces of the aggregate/high-surface-area polymer, or other concrete material, and as the water volume decreases, $CO_2$ is liberated from the bicarbonate ions ($HCO_3^-$) to produce carbonate ions ($CO_3^{-2}$), with resultant increase in pH of the remaining mixture volume. The increase in liquid pH promotes the conversion of $Ca(HCO_3)_2$ into $CaCO_3$ which will precipitate onto nearby surfaces. This repeated pair of activities will promote the development of a carbonate film on the aggregate and/or high-surface-area polymer.

This cycle is repeated as required to build a thin layer, for example 25 microns or 50 microns of $CaCO_3$ on the aggregate or high-surface-area polymer. It is important to terminate the process before the aggregate or high-surface-area polymer becomes fused into a solid mass that is not broken up simply by opening the gate valve on the bottom of Hopper 5. The $CaCO_3$ that adheres to the hopper walls can be recovered and reused by dissolving it into a dilute acid, for example hydrochloric acid and then reclaiming it from the acid by reducing the pH.

Hopper 5 is specifically designed to accomplish this task by having one or more vertical channels that are narrow enough to allow gas to pass through them without high differential pressure. It also has a spring-loaded check valve at the top of and along the full length of each vertical channel. This device prevents the $CO_2$ rich air from exiting the vessel. The bottom portion of each hopper fill chute section contains a check valve assembly. The chute is deliberately long enough to become buried in the aggregate/high-surface-area polymer when the channel is full. The protrusion of the chute into the aggregate/high-surface-area polymer prevents the recirculated air from bypassing the aggregate.

The Hopper 5 assembly includes the ability to heat air. The air is preferably heated by use of a heat exchanger coupled with a thermal source like waste heat from combustion exhaust or heat from liquid heated using an environmentally friendly technology like solar. See FIG. 13 for details on Hopper 5.

Figure 14:
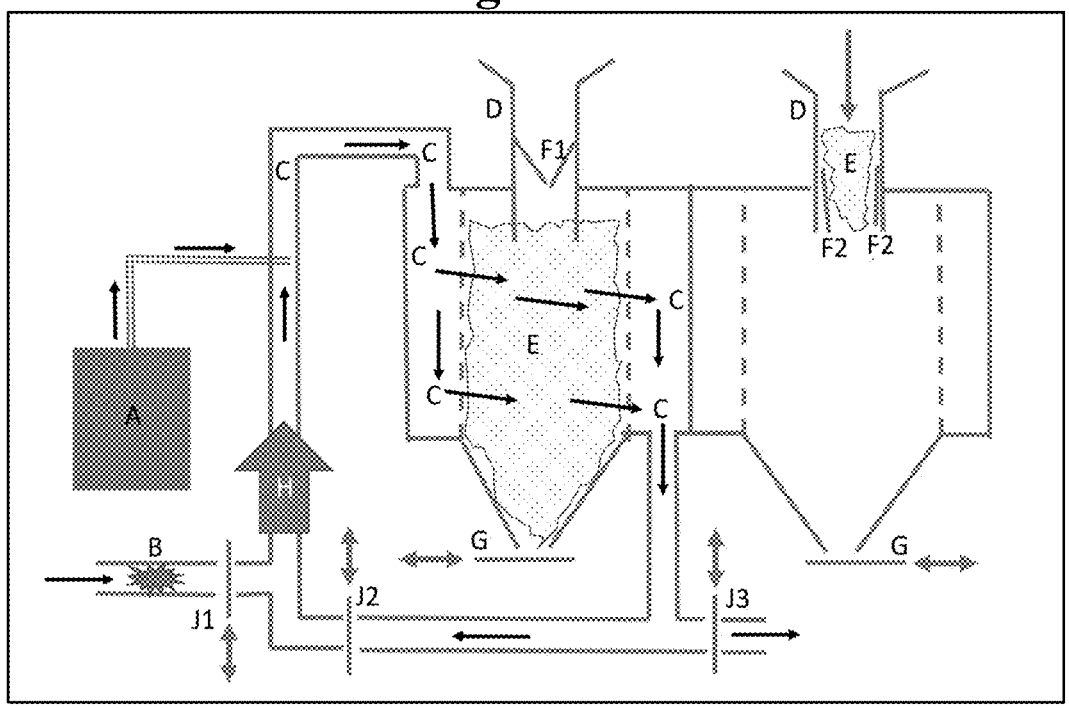
FIG. 14 illustrates details for Hopper 5 as shown in FIG. 13.

Key to FIG. 14

| KEY | DESCRIPTION |
|---|---|
| A | Carbonated mineral water generator (Reaction Chamber C on FIG. 13) |
| B | Heating device or heat exchanger for air, ideally using waste heat. |
| C | Warm air or air with high humidity from carbonated mineral water generator. |
| D | Chute assembly for introduction of aggregate/high-surface-area polymer. |
| E | Aggregate and/or high surface-area-polymer. |
| F1 | Closed valve used to introduce aggregate/polymer into hopper |
| F2 | Open valve used to introduce aggregate/polymer into hopper. |
| G | Closed valve used to release aggregate/polymer from hopper into Reaction Chamber D. |
| H | Blower to circulate the conditioned air through the aggregate/polymer. |
| J | Valves used to redirect air flow between two ventilation cycles. |

Figure 15:
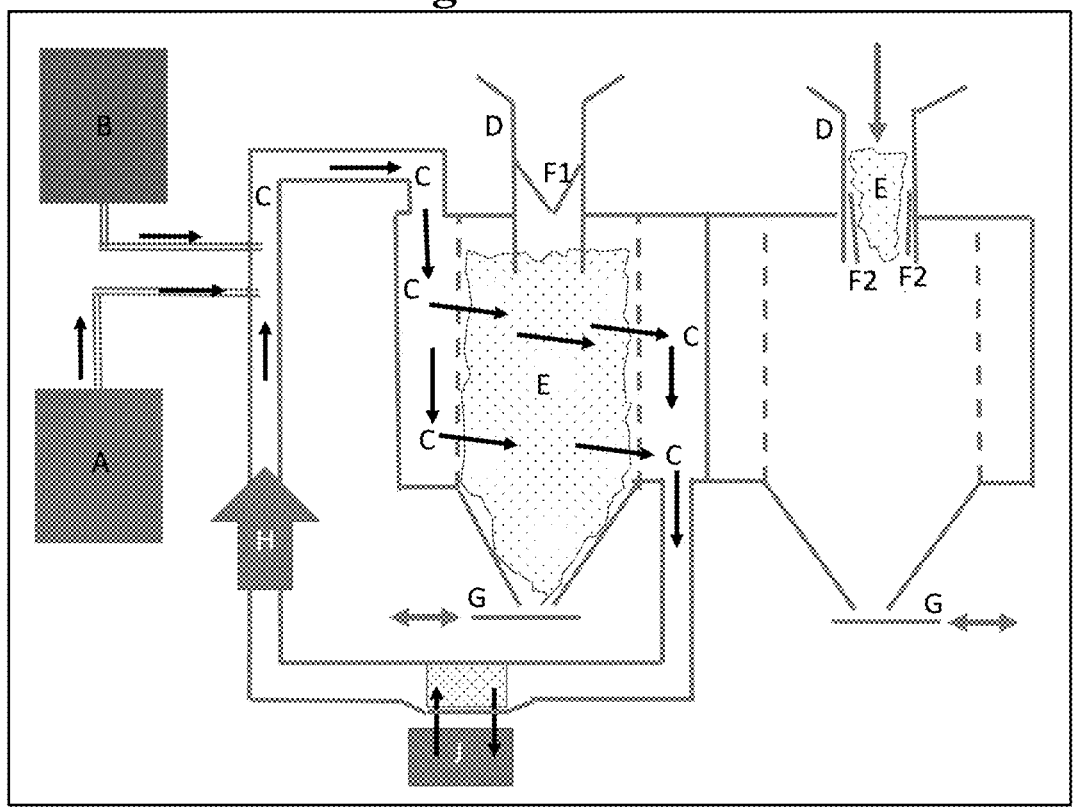
FIG. 15 illustrates details for Hopper 5 in FIG. 13, 4th embodiment.

Key to FIG. 15

| KEY | DESCRIPTION |
|---|---|
| A | Carbonated mineral water generator (Reaction Chamber C on FIG. 13) |
| B | Alkaline water storage and dosing system. |
| C | Air or other gas with repeating 4-step sequential treatment: (a) aerosol containing alkaline liquid; then (b) dry air(gas); then (c) aerosol containing calcium liquid; then (d) dry air (gas). |
| D | Chute assembly for introduction of aggregate/high-surface-area polymer. |
| E | Aggregate and/or high-surface-area polymer. |
| F1 | Closed valve used to introduce aggregate/polymer into hopper. |
| F2 | Open valve used to introduce aggregate/polymer into hopper. |
| G | Closed valve used to release aggregate/polymer from hopper into Reaction Chamber D. |
| H | Blower to circulate the conditioned air through the aggregate/polymer. |
| J | Air (gas) dehumidifier using desiccant (or other method) with desiccant regeneration unit. |

In the third embodiment of this $CaCO_3$ enhancement for aggregate and high-surface-area polymer, the precipitation of $CaCO_3$ is promoted by pretreating the aggregate or other material with a caustic aqueous solution, for example calcium hydroxide ($Ca(OH)_2$). This treatment is followed exposing the aggregate or other concrete mix component with a liquid containing $Ca(HCO_3)_2$. The aggregate or other compound is then exposed to dry air or equal to remove water. This sequence is repeated in alternating cycles until a film of $CaCO_3$ between 25 microns or 50 microns is deposited on the aggregate or other concrete component. The compounds can be introduced to the aggregate or other material as a mist or as a liquid according to procedures previously described.

In the fourth embodiment of this $CaCO_3$ enhancement for sand, small aggregate, and high-surface-area polymer occurs by lifting the target materials into the air with warm air or other gas that alternately contains an alkaline material, for example $Ca(OH)_2$ and $Ca(HCO_3)_2$. Warm air without moisture is used after the $Ca(HCO_3)_2$ (for example). This warm air will dry the granular material between alternating treatments. See FIG. 16 for details.

Figure 16:
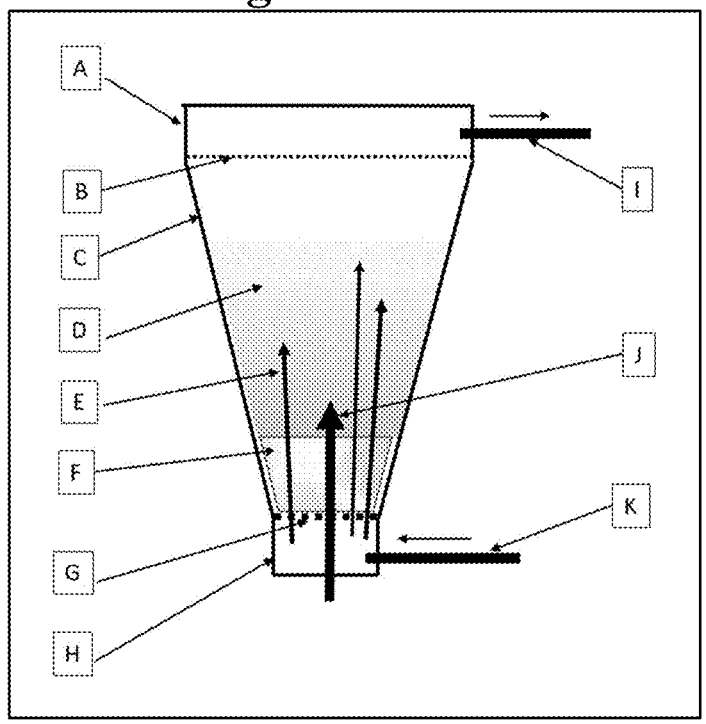
FIG. 16 illustrates an embodiment of an air lift material coating system.

Key to FIG. 16

| KEY | DESCRIPTION |
|---|---|
| A | Exhaust plenum for gas fumes generated during the coating process below. |
| B | Screen & filter to prevent particles and coated objects from leaving the coating chamber. |
| C | Coating chamber. It can be any conical shape. |
| D | Suspended objects. The lifting air pressure dissipates with elevation because the area of the cone is larger. This causes the lifted objects to fall back into the chamber. |
| E | Warm dry gas used to lift coated objects up into the spray in upper areas of conical coating chamber. |
| F | Collected objects in the process of becoming coated when lifted into the upper area of the conical coating chamber. |
| G | Screen that prevents particles and objects from falling into the lower air plenum. |
| H | Plenum of hot air used to lift the particles and objects into the upper area of the conical coating chamber. |
| I | Exhaust gas duct to air filtration / scrubbing device. |
| J | Spray coating nozzle. |
| K | Warm gas entering plenum and used to lift objects and particles. |

The production of concrete using this technology begins when materials are introduced into Reaction Chamber D as described on FIG. 13. This occurs in the following sequence: (a) opening a valve on one or more Hopper 5 vessels affixed to Vessel D and allow the transfer of a pre-determined amount of aggregate and/or high-surface-area polymer. If more than one "Hopper 5" vessel is provided, they can contain different add mixtures, for example, one could contain stone aggregate, and another contain high-surface-area polymer. The quantity of transferred product can be determined via weigh difference in Hopper 5 or by transferring the material into or onto a weighing device; (b) at the same time, a motorized valve on Hopper 7 allows a pre-determined amount of sand (or other material) into Reaction Chamber D. The quantity of sand (or other material) transferred product from Hopper 7 can be determined via weigh difference in Hopper 7 or by transferring the material into or onto a weighing device; (c) the materials are mixed; subsequently, as mixing continues (d) a motorized valve on Reaction Chamber C opens to transfer a pre-determined amount of carbonated mineral water into Reaction Chamber D through a pipe (Item 4 on FIG. 13). The volume of transferred liquid is measured via a flow meter or other means; and (f) the requisite amount of $CO_2$ is added into Reaction Chamber D via piping (Item 6 on FIG. 13) with valving that connects Reaction Chamber A and Reaction Chamber D. The mixing continues until the concrete components are fully integrated; then (g) with continued mixing, a valve on Hopper 8 opens and introduces a predetermined amount of portland cement, or other plasticizing compound into Chamber D. The quantity of portland cement, for example is determined by change in weight of Hopper 8 or by measuring the weight or volume of the material as it is transferred to the chamber. Hopper 8 is sealed and pressurized to allow the cement or equal to enter Chamber D without losing $CO_2$ into the atmosphere.

The continued addition of $CO_2$ from Reaction Chamber A via piping identified as #6 on FIG. 13 occurs at any pre-determined times during this sequence to augment $CO_2$ consumed in Reaction Chamber D as a result of the concrete hydration process. When the product mix requirement specifies the addition of $CO_2$, a valve is opened that allows a pre-determined quantity of gas to enter Reaction Chamber D. This can be measured by monitoring the concentration of $CO_2$ in Reaction chamber D or by other means.

The concrete mixing continues as specified in the product mix procedure. $CO_2$ addition is discontinued several minutes prior to the end of the mix so the $CO_2$ in Reaction Chamber D headspace can be integrated into the product mix before the valve on Reaction Chamber D is opened to release the finished product into "E" as specified on FIG. 13. This process prevents release of $CO_2$ into the atmosphere. When mixing is complete, the process is complete, and the finished concrete is ready to leave Reaction chamber D and be used on a construction project.

If an automated process control system is included in the equipment package, the affiliated sensors provide process progress data that the control logic utilizes to time the mixing events, regulate the rate and amount of product flow, and determine when each activity is complete. The process PLC generates a product/batch report and saves it or prints it as required.

What is claimed is:

1. A method of increasing the strength and integrity of a concrete mix, comprising the steps of:
    partially dissolving a predetermined quantity of a clean and chipped polymer;
    cooling the polymer and adding sodium hydroxide (NaOH) in methanol ($CH_3OH$) to produce dimethyl terephthalate DMT ($C_6H_4(COOCH_3)_2$) and ethylene glycol EG ($HOCH_2CH_2OH$);

air-drying the polymer;

introducing the partially dissolved polymer to the DMT and EG monomers, along with a catalyst and a non-reactive porogen solvent to create a re-formed polymer having a surface area of $10^1$ to $10^3$ m$^2$/g;

rinsing the polymer in $H_2O$;

bathing the polymer with agitation in a calcium bicarbonate (Ca(HCO$_3$)$_2$) solution at a pH of between 7 and 10; and air-drying the polymer after the calcium bicarbonate bath; and adding the polymer to the concrete mix.

2. The method of claim 1 further comprising the step of integrating the polymer into the crystalline structure of C—S—H and CaCO$_3$ as the concrete mix cures.

3. The method of claim 1 wherein the polymer comprises recycled PET water bottles.

4. The method of claim 1 wherein the dissolving is accomplished by degradation using heated dimethyl sulfoxide (DMSO) (C$_2$H$_6$OS) as a solvent and hydrotalcite (Mg$_6$Al$_2$CO$_3$(OH)$_{16}$*4H$_2$O) as a catalyst.

5. The method of claim 1 wherein the polymer is air-dried at 190 degrees Celsius to remove any remaining DMSO.

6. The method of claim 1 wherein the catalyst is antimony oxide (Sb$_2$O$_3$).

7. The method of claim 1 wherein the porogen comprises toluene or cyclohexanone.

8. The method of claim 1, further comprising the step of metering a predetermined amount of water and carbonate into a first reaction chamber.

9. The method of claim 8, further comprising the step of metering a predetermined amount of CO$_2$ into the first reaction chamber to make carbonic acid (H$_2$CO$_3$), with a remainder of the CO$_2$ going into solution within H$_2$O and a headspace of the first reaction chamber.

10. The method of claim 9, further comprising the step of introducing the H$_2$O into a second reaction chamber.

11. The method of claim 8, further comprising the step of hydrating the concrete mix with the water and carbonate of the first reaction chamber.

* * * * *